INVENTOR
DIRK JOHAN BRAAK
BY Fred M. Vogel
AGENT

INVENTOR.
DIRK JOHAN BRAAK
BY
Fred M. Vogel
AGENT 2,901,543
Patented Aug. 25, 1959

2,901,543

RADIO SYSTEM COMPRISING A MAIN STATION AND A PLURALITY OF SUBSTATIONS

Dirk Johan Braak, Hilversum, Netherlands, assignor, by mesne assignments, to North American Philips Company, Inc., New York, N.Y., a corporation of Delaware Application June 7, 1955, Serial No. 513,727

Claims priority, application Netherlands June 15, 1954

5 Claims. (Cl. 179—15.5)

The invention relates to a radio transmission system for communications between a main station and a plurality of substations, in which prior to the exchange of information the transmitter of the main station emits a call to be received by the receiver of each substation.

Such systems are used for example by the police, the fire brigade, taxicab enterprises and so on to exchange radio information between a main station and substations, for example mobile substations arranged in cars.

Before transmitting an information destined for a particular substation, the main station sometimes pronounces a call, for example "Taxi 501, and so on"; this call is received by each of the substation receivers. If no special steps are taken, the substations which are not called, are obliged to listen to the subsequent information in order not to miss any further information which might be destined for themselves. It is disturbing and tiring to listen continuously to these conversations and the attention of the operator of the substation is thus reduced.

It is known to obviate these disadvantages by using a selective call system in which case the main station is adapted to transmit individual call signals composed for example of various tones and the substations are provided with a call selector, which responds only to the corresponding tone combination and then releases the normally blocked receiver. However, such a selective call system requires a complicated, costly apparatus.

In order to avoid such a costly, selective call system it is known to transmit a blocking tone of for example 14 kc./s., exceeding the reproduced speech-frequency band of for example 0.3 to 3.4 kc./s. during the exchange of information and subsequent to a call in order to block the substation receivers: this blocking is released by lifting the earphone from the hook in the event of a call.

The invention has for its object to provide a communication system of the kind described in the opening part, in which, irrespective of the modulation method, for example, amplitude modulation or frequency modulation, in a particularly simple and efficient manner the necessity of continuous listening at the substation is rendered superfluous.

According to the invention the transmitter of the main station is provided with a release-tone generator, a blocking-tone generator and means to omit automatically, for a short duration the release tone and the blocking tone before and after respectively a call preceding an exchange of information, whilst the receiver of the substation is provided with a blocking circuit, which normally interrupts the reproducing circuit, and with filters which are selective for the release tone and the blocking tone respectively and the output voltages of which control the blocking circuit in a manner such that at the reception of the release tone the reproducing circuit is closed and again interrupted at the subsequent reception of the blocking tone, the receiver being furthermore provided with a switch by which, irrespective of the position of the blocking circuit, the reproducing circuit can be closed.

A particularly efficient, practical embodiment of the system is obtained, if the frequencies of the release tone and the blocking tone lie in the range of the high transmissible speech frequencies, their frequency difference being less than 300 c./s.

The invention and its advantages will be described more fully with reference to the figures, which show a main station and a substation for frequency-modulation duplex communication.

Figs. 1*a* and 1*b* show a main station and a substation respectively, the latter being adapted to cooperate with the former;

Figure 1A:
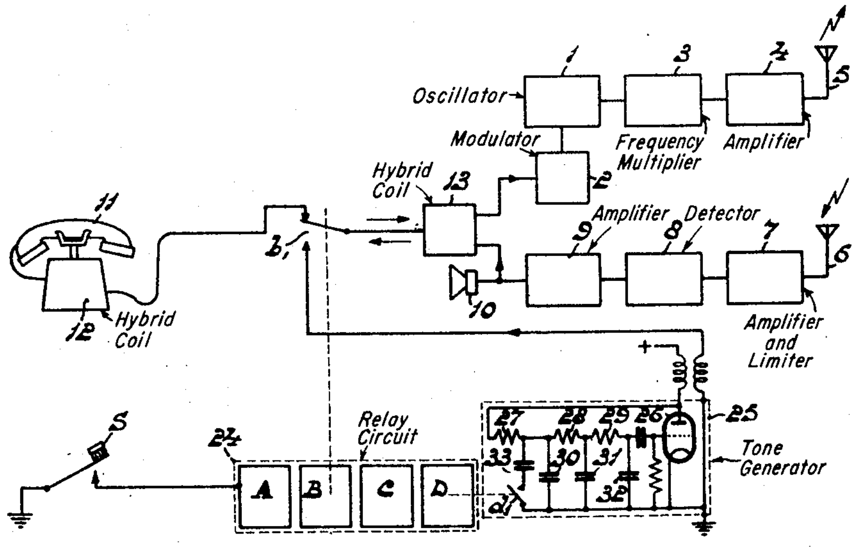

The main station shown in Fig. 1*a* comprises a frequency-modulation transceiver for duplex communication. The transmitter comprises an oscillator 1 and a modulation stage 2, to be governed by output signals. The frequency-modulated oscillations obtained are supplied through a frequency-multiplying stage 3 to an output amplifier 4 and an aerial 5 connected thereto.

The main station comprises furthermore a receiver, connected to an aerial 6. The incoming signals are supplied through a high-frequency preamplifier and an intermediate-frequency amplifier-limiter 7 to a detector 8. The detected signals are supplied through a low-frequency amplifier 9 to a loudspeaker 10.

At the control-area of the main station provision is made of a telemicrophone 11, the microphone and the telephone of which are connected through hybrid coils 12, 13 to the modulation stage 2 of the transmitter and the low-frequency amplifier 9 of the receiver respectively.

Figure 1B:
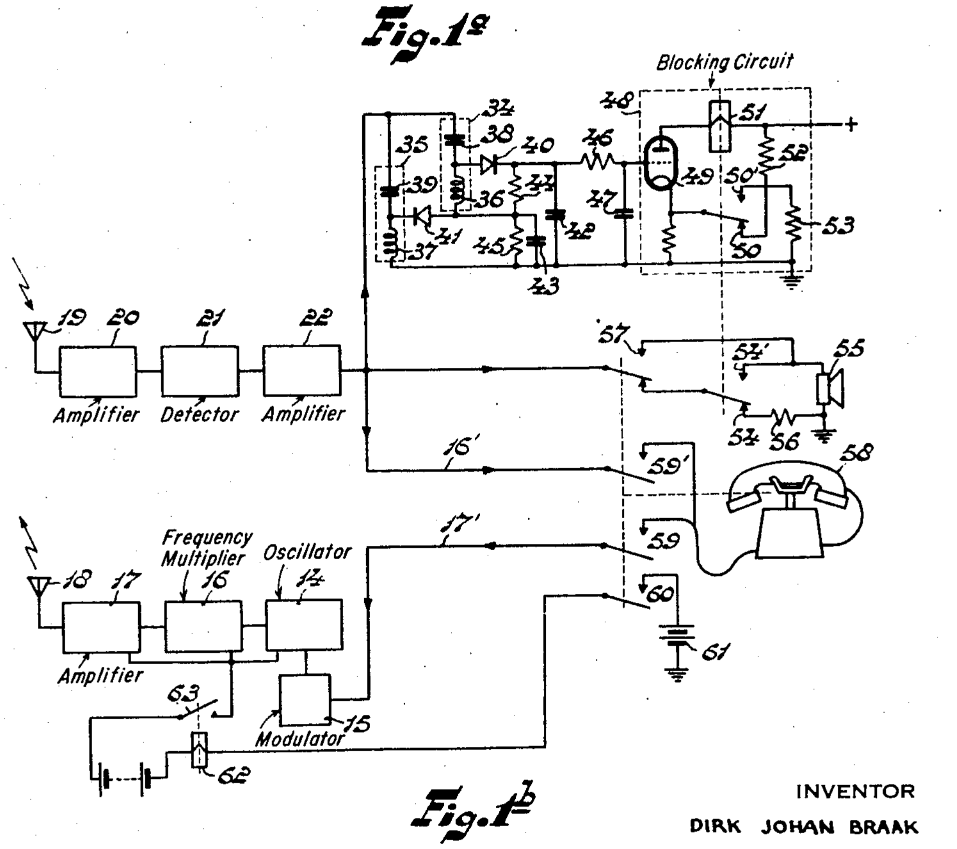

Fig. 1*b* shows a substation cooperating with the main station shown in Fig. 1*a*.

The substation transmitter is principally similar to the transmitter of the main station and comprises an oscillator 14, a modulator 15, a frequency multiplying stage 16, an output amplifier 17 and a transmiter aerial 18.

The receiver of the substation corresponds principally to that of the main station and comprises an aerial 19, a high-frequency and intermediate-frequency amplifier 20, a detector 21 and a low-frequency amplifier 22.

The transceiver so far described is of known type, so that no detail construction is shown.

According to the invention the main station shown in Fig. 1*a* comprises a call switch S provided at the control area and connected to a relay circuit 24, to be described in detail with reference to Fig. 2, and comprising a main relay A, a tone transmitting relay B, an auxiliary relay C and a tone changing relay D, whilst the main station furthermore comprises a single tone generator 25 to produce a release tone and a blocking tone.

The output circuit of the tone generator 25 may be coupled through a change-over contact *b*1 of the tone transmitting relay B, with the low-frequency input circuit of the transmitter. The change-over contact *b*1 may be connected to this end between the hybrid coils 12 and 13 or else between the hybrid coil 13 and the transmitter modulator 2. The tone generator 25 is constituted by an RC-oscillator, comprising a triode 26 having a frequency-determining, phase displacing network connected between the anode and the control grid, this network having series resistors 27, 28, 29 and parallel capacitors 30, 31, 32. The phase shifting network comprises an additional parallel capacitor 33 in series with a working contact *d*1 of the tone changing relay D. If the working contact $d1$ is open the oscillator 25 is tuned to the release tone, whereas after the additional parallel capacitor 33 has been switched on, the oscillator is tuned to the blocking tone.

In the substation shown in Fig. 1*b* the receiver is provided, in accordance with the invention, with a release tone filter 34 and a blocking tone filter 35, connected to the output of the receiver and constituted each by the series combination of a coil 36 and 37 respectively and a capacitor 38 and 39 respectively. To these filters are connected detectors having rectifiers 40 and 41 respectively and output resistors 44 and 45 respectively, shunted by capacitors 42 and 43 respectively. The output resistors 44 and 45 are connected in series in a manner such that the voltages supplied thereto through rectifiers 40 and 41 have opposite polarities. To the series combination of the output resistors is connected through a low-pass filter 46, 47 a blocking circuit 48, which normally cuts off the low-frequency part of the receiver. This blocking circuit comprises a triode 49, which is normally cut off by a grid bias voltage. To this end the cathode is normally connected to the anode-voltage lead through a change-over contact 50 in the rest position of a relay 51 included in the anode circuit and through a resistor 52. In the working position the change-over contact is connected to earth through 50′ and a resistor 53. A second set of contacts of the relay 51, i.e. a change-over contact having the working position 54′ and the rest position 54, serve to connect the low-frequency amplifier 22 to either a loudspeaker 55 or to an earth-connected resistor 56.

The exchange of information between the main station shown in Fig. 1*a* and the substation shown in Fig. 1*b* takes place as follows.

In the rest position the receivers of all stations are switched on, but in the substation receivers the blocking circuit is operative.

If the main station desires to exchange information with one or more of the substations, the call switch S is closed, when the transmitter has been switched on. Thus, by means of the relay circuit 24 a release tone taken from the tone generator 25 is supplied automatically, for a short duration, for example for about 0.5 to 1 sec. to the transmitter input through the change-over contact *b1* of the tone transmitting relay B.

All substation receivers receive the release tone emitted by the main station, this tone (as is shown in Fig. 1*b*) producing a positive voltage across the output resistor 44 through the release tone filter 34 and the rectifier 40 connected thereto. This positive voltage is applied, through the RC-filter 46, 47, to the control-grid of the normally cut-off triode 49. The triode then takes anode current, so that the relay 51, included in the anode circuit, is lifted, the relay contacts 50, 54 are opened and the relay contacts 50′, 54′ are closed. Owing to the break of the contact 50 the cut-off grid bias voltage supplied through the resistor 52 to the cathode of the tube is cut off. Through contact 50′ the resistor 53 is then connected in parallel with the cathode resistor and the triode 49 is adjusted in a manner such that, even subsequent to the termination of the release tone, it takes anode current and relay 51 remains energized. At the same time, owing to the energization of relay 51, the cut-off of the receiver output circuit due to contact 54 is released and the loudspeaker 55 is switched on through contact 54′.

All substations then occupy the position of listening-in. A call then pronounced at the main station before the microphone is heard in the loudspeakers of each of the substations. The substation called reports to the main station by lifting the telemicrophone 58 from the hook and by replying to the call. When the telemicrophone 58 is lifted from the hook, the hook contacts 57, 59, 59′, 60 of a multiple switch are closed. Owing to the closure of the hook contacts 59, 59′ the telemicrophone 58 is connected through leads 16′ and 17′ on the one hand to the receiver output 22 and on the other hand to the input of the transmitter modulator 15. Through the hook contact 60 a voltage from a voltage source 61 is supplied to a transmitter relay 62. This transmitter relay has a contact 63, which switches on the substation transmitter when the relay 62 is lifted. The hook contact 57 connects the loudspeaker 55 directly to the receiver output, so that the contact 54, which cuts off the loudspeaker, is made inoperative.

After the call has been pronounced in the main station, the call switch S is opened, after which, by means of the relay circuit 24, automatically and for a short duration, for example for about 0.5 to 1 sec., a blocking tone obtained from the tone generator 25 is supplied through the working contact *b1* of the tone transmitting relay B to the input of the transmitter.

The blocking tone, emitted by the main station, is received in all substations and produces a negative voltage across the output resistor 45 by way of the blocking-tone filter 35 and the rectifier 41, connected thereto. This negative voltage is supplied through the RC-filter 46, 47 to the control-grid of the conductive triode 49, and produces the cut-off of this triode. Thus the relay 51 included in the anode circuit of the triode is de-energized and the blocking circuit becomes again operative. The substation receivers are then again blocked, however with the exception of the substation called, where the hook contact 57 puts the blocking circuit out of circuit.

In the embodiment shown the blocking circuit 48 in the substations comprises a triode and a relay. Of course, if desired, use may be made of a blocking circuit which operates completely electronically.

The relay circuit 24 in the main station through which a release tone and a blocking tone are emitted automatically and for a short duration, when a call switch is closed and opened respectively, may of course, be constructed in various ways, for example by using electronic relays. The use of mechanical relays is frequently to be preferred for reasons of costs; therefore only such a relay circuit will be described in detail hereinafter.

Figure 2:
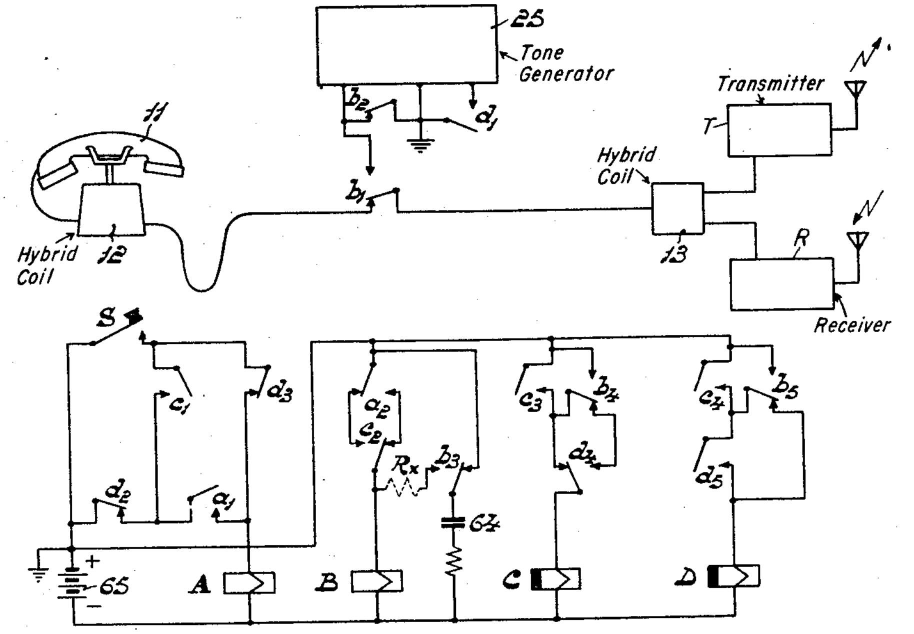
Fig. 2 shows a detail embodiment of the relay circuit shown diagrammatically in Fig. 1*a*.

The relay circuit shown in Fig. 2 comprises the aforesaid main relay A, the tone transmitting relay B, the auxiliary relay C and the tone changing relay D. Fig. 2 also shows the telephone 11, the call switch S, the hybrid coils 12 and 13 and the transmitter T and receiver R connected thereto and the tone generator 25 in a block diagram, these elements being provided at the control-area. All relay contacts are shown in the positions of rest in the absence of energization. The energy required for the energization of the relays is normally obtained from a common voltage source 65. It should be noted that, if desired, the relay A may be provided with a separate voltage source for remote control.

In the rest position none of the relays A to D is energized and the tone generator is tuned to the frequency of the release tone. Across the break contact *b1* of the tone transmitting relay B the speech circuit of the telephone 11 is then connected to the low-frequency circuits of the radio apparatus. The break contact *b2* short-circuits the output of the tone generator 25. An electrolytic capacitor 64 is held in the charged condition across the contact *b3* for temporary auxiliary energization of the relay B.

The relay circuit becomes operative, when the call switch S is closed. Then the energizing circuit of the main relay A is closed from the negative terminal of a voltage source 65 through the energizing winding of the main relay A, the break contact *d3* and the call switch S to earth. Relay A is thus lifted, so that the contacts *a1* and *a2* are closed. The contact *a1* closes a first holding circuit for the relay A from the voltage source 65 through the energizing winding of main relay A, and contacts *a1* and *d2* to earth. Contact *a2* closes the main energizing circuit for the tone transmitting relay B through contacts $c2$ in the rest position and $a2$ in the working position to earth. The relay B is lifted, so that the tone generator 25 tuned to the release tone frequency is connected to the transmitter through the changed-over contact $b1$ whilst the break contact $b2$, which is now open, obviates the short-circuit of the tone generator. When the tone transmitting relay B is lifted, the contacts $b3$, $b4$ and $b5$ are also changed over.

The contact $b3$ closes an auxiliary energizing circuit with the holding capacitor 64 for the tone transmitting relay B. Contact $b4$ closes an energizing circuit for the auxiliary relay C from the voltage source 65 through the energizing winding of the auxiliary relay C, contact $d4$ in the rest position and contact $b4$ in the working position to earth. The auxiliary relay C is then lifted, so that the working contact $c1$ closes a second holding circuit for the main relay A from the voltage source 65 through the energizing winding of the relay A, the working contacts $a1$ and $c1$ and the call switch S to earth. This second holding circuit shunts the break contacts $d2$ and $d3$ included in the first holding circuit and the energizing circuit of relay A respectively. The contact $b4$ in the energizing circuit of the auxiliary relay C is shunted by the contact $c3$ to close a holding circuit through contact $d4$.

The working contact $c4$ included in the energizing circuit of the tone changing relay D is closed to prepare the energization of the tone changing relay D.

When the auxiliary relay C is lifted, the contact $c2$ is changed over into the working position, so that the main energizing circuit of the tone transmitting relay B is interrupted. The relay B, however, remains energized until the holding capacitor 64 included in its auxiliary energizing circuit is discharged. The time constant of this auxiliary energizing circuit determines the duration of the transmission of the tone from the tone generator 25. This duration may, for example, be 0.5 to 1 sec. When the tone transmitting relay B is de-energized, all its contacts again occupy the position shown. Through contact $b1$ the speech circuit of the telephone 11 is again connected to the radio apparatus, whilst contact $b2$ again short-circuits the output of the tone generator. The change-over contact $b3$ included in the auxiliary energizing circuit of the tone transmitting relay B connects the capacitor 64 again to the voltage source, so that it is recharged. The contact $b4$ in the energizing circuit of the auxiliary relay C is shunted by the holding contact $c3$, so that the auxiliary relay is not de-energized.

The contact $b5$ closes an energizing circuit for the tone changing relay D from the voltage source 65 through the energizing winding and contacts $b5$ in the rest position and $c4$ in the operative position to earth. The tone changing relay D is then lifted. By means of the make contact $d1$ the tuning frequency of the tone generator 25 of Fig. 1*a* is changed into the blocking tone frequency. The break contacts $d2$ and $d3$ interrupt the first holding circuit and the energizing circuit respectively of the main relay A. Since the break contact $d3$ is shunted by the make contacts $c1$ and $a1$ of the second holding circuit of the main relay A, this relay remains energized through contacts $a1$ and $c1$ and the call switch S, when the tone changing relay D is lifted. The contact $d4$, when it changes over into the operative position, changes over the auxiliary relay C to a further energizing circuit, i.e. through the energizing winding of the auxiliary relay C and contacts $d4$, $b4$ and $c3$ to earth. The auxiliary relay C is de-energized with time lag by means of a short-circuiting ring, so that the relay C is not de-energized in the short time required to change over the change-over contact $d4$.

The conditions then prevailing, in which the call switch S is closed, the relays A, C and D are lifted and relay B is de-energized, are maintained as long as the call switch S remains closed. The main station can then call the desired substation. In this case, the opening of the call switch S interrupts the energizing circuit of the main relay A. Relay A is thus de-energized. Contact $a1$ then interrupts both the first and the second holding circuit of relay A; since also $d3$ is opened, relay A can be energized, when call switch S is closed, not until relay D has been de-energized ($d3$ closed). This is of importance with respect to any erroneous control of the call switch S, which will be dealt with hereinafter. Contact $a2$ in the energizing circuit of the tone transmitting relay B returns into the rest position, when relay A is de-energized and closes again an energizing circuit for the tone transmitting relay B, i.e. from the voltage source 65 through the energizing circuit of B, contact $c2$ in the operative position and the contact $a2$ in the rest position to earth. The tone transmitting relay B is again lifted, so that the tone generator 25, now tuned to the blocking tone frequency, is re-connected to the radio apparatus through contact $b1$ in the operative position, whilst contact $b2$ again obviates the short-circuit of the output of the tone generator. The contact $b3$, changed over into the operative position, closes again the auxiliary energizing circuit including the holding capacitor 64 for the tone transmitting relay B. Contact $b4$ interrupts the energizing circuit of the auxiliary relay C, whilst contact $b5$ closes a second holding circuit for the tone changing relay D.

Owing to the interruption of the energizing circuit of the auxiliary relay C due to contact $b4$, relay C is de-energized, so that all contacts thereof re-occupy the positions shown. Contact $c4$ in the energizing circuit of the tone changing relay D is then shunted by the contact $b5$, changed over into the operative position, so that relay D remains energized through the contacts $d5$ and $b5$, changed over into the operative positions, to earth.

Contact $c2$ interrupts the main energizing circuit of tone transmitting relay B; this relay however, remains energized in the manner described above until the holding capacitor 64 include in the auxiliary energizing circuit thereof, is discharged. After about 0.5 to 1 sec. the relay B is de-energized, so that through contact $b1$ the speech circuit of the telephone 11 is re-connected to the radio apparatus, whilst contact $b2$ again short-circuits the output of the tone generator. The contact $b3$, included in the auxiliary energizing circuit of tone transmitting relay B, again closes the charging circuit of the holding capacitor 64.

Contact $b5$ interrupts the energizing circuit of the tone changing relay D. Relay D is thus de-energized, so that all its contacts re-occupy the positions shown. By means of the make contact $d1$, changed over into the rest position the tuning frequency of the tone generator 25 is again changed into the release tone frequency. The break contact $d3$ in the energizing circuit of the main relay A then permits of energizing again the main relay A by closing the call switch S. The rest position of the relay circuit is then re-established.

Figure 3:
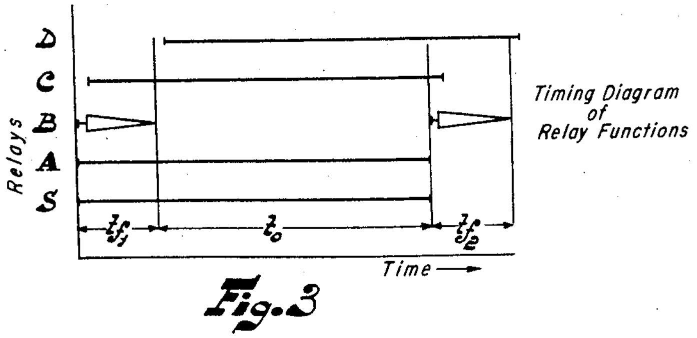
Fig. 3 shows a time diagram to explain the relay circuit shown in Fig. 2.

Fig. 3 shows a time sequence diagram of the successive energizing conditions of the relays A, B, C and D and of the call switch S. The time axis $t$ is divided into a period $t_{f1}$, during which the release tone is emitted, a period $t_0$, the time required to pronounce the call and a period $t_{f2}$, during which the blocking tone is emitted.

With reference to the time diagram the operation of the relay circuit described above will now be resumed briefly.

It is evident from the said diagram that, when the call switch S is closed, the relays A, B and C are energized in succession with a small difference in time. The relays A and C remain then energized as long as the call switch S is closed, whilst the main energizing circuit of the tone transmitting relay B is interrupted, when relay C is lifted. The relay B, however, then remains energized for a short duration owing to the holding capacitor 64; this condition of the tone transmitting relay B is indicated in the diagram by a triangle. For the time $t_{f1}$ in which relay B is energized, the release tone is emitted. When the tone transmitting relay B is de-energized, the tone changing relay D is lifted, so that the tone generator 25 is detuned to the blocking tone frequency. After the call has been pronounced, the call switch S is opened, so that the main relay A is de-energized. Then the tone transmitting relay B is re-energized. Upon the energization of relay B, the auxiliary relay C is de-energized, so that the main energizing circuit of the tone transmitting relay B is interrupted and this relay remains energized for a short duration (indicated by the triangle) owing to the holding capacitor 64. For the time $t_{f2}$ in which the relay B is energized, the blocking tone is emitted. When the tone transmitting relay B is de-energized, the tone changing relay D is also de-energized, so that the rest position is re-established.

The relay circuit described above may be simplified without affecting the desired automatic, transient transmission of the release tone and the blocking tone. From the diagram it is evident that the main relay A is always energized, when the call switch S is closed. Since the main purpose of the relay A is to close the main energizing circuit of the tone transmitting relay B by changing over the contact *a2*, when the call switch S is closed and opened respectively, this contact *a2* may, if desired, be replaced by the call switch S, so that the main relay A may be dispensed with. The relay circuit thus simplified, however, is not sufficiently safeguarded from an erroneous control of the call switch S, which is then constructed in the form of a change-over contact, whilst, moreover, more wires are required.

An error of the control may, for example, consist in an interrupted closure of the call switch. This could result in a permanent release of the substation receivers, which, however, is prevented by the main relay A. If the closure of the call switch S is sufficiently long (for example about 12 msec. to energize the main relay A), the opening of the call switch S immediately thereafter is ineffective, since the relay A remains energized through the holding circuit with contacts *a1* and *d2*. The release tone and the blocking tone are then transmitted immediately one after the other in the manner described above until the rest condition is re-established. The time of the emitted tones is then normal. In order to charge the capacitor 64 sufficiently in the short time then occurring between the transmission of the two tones, this period is prolonged slightly by damping the tone changing relay D with copper, so that the relay D is lifted with some time lag.

A further error of the control may, for example, be an opening of the call switch S for a short duration during the pronunciation of the call. This could result in that substation receivers remain cut off, which is also prevented by the main relay A, since thus, when the relay A is de-energized during a call owing to the opening of the switch S, a closure of the call switch S immediately thereafter remains ineffective, since the contacts *a1* and *d3* have interrupted the energizing circuit and the holding circuits respectively of the relay A. Then, in the normal manner, first the blocking tone is transmitted, whilst not until then, when the call switch S is closed, the main relay A is energized and the release tone is transmitted.

Consequently, owing to the relay A, a tone once started is transmitted for the full period, in spite of errors of the control, whilst at the same time the tones are always produced in the desired order of succession.

What is claimed is:

1. A communication system comprising a main station and a plurality of substations, said main station including a transmitter comprising signal-transmitting means, means providing a calling signal for calling a substation, means for generating a release tone, means for generating a blocking tone, means for temporarily transmitting said release tone immediately before calling a substation, means for transmitting said blocking tone temporarily after calling a substation, and means for transmitting information after said temporary transmission of the blocking tone, and said substations each including a receiver comprising reproducing means for reproducing said information, a blocking circuit for selectively blocking said reproducing means in response to said tones, first filter means connected to feed said release tone when it occurs to said blocking circuit for rendering operative said reproducing means, second filter means connected to feed said blocking tone when it occurs to said blocking circuit for rendering inoperative said reproducing means, whereby all of said substations are caused to reproduce said calling signal and thereafter are normally prevented from reproducing said information and a switch connected to selectively render operative said reproducing means irrespective of the blocking condition of said blocking circuit, whereby a called substation may selectively be switched into the operative condition so as to reproduce said information.

2. A system as claimed in claim 1, in which said release tone and said blocking tone have frequencies which differ by less than 300 cycles per second and which lie in the frequency range of the relatively higher transmitted information signals.

3. A system as claimed in claim 1, in which said transmitter includes a call switch for actuating said calling means, means connected to transmit said release tone temporarily when said call switch is closed, and means connected to transmit said blocking tone temporarily when said call switch is opened.

4. A system as claimed in claim 3, in which said transmitter further includes means for automatically transmitting said release tone and said blocking tone under the control of said call switch, said last-named means comprising a tone generator and a tone varying relay connected to normally cause said tone generator to generate said release tone and to generate said blocking tone when actuated, a tone-transmitting relay having contacts for connecting the output of said tone generator to said signal-transmitting means, means for actuating said tone-transmitting relay temporarily when said call switch is closed thereby causing said temporary transmission of the release tone, means for actuating said tone varying relay upon completion of said temporary transmission of the release tone, and means for actuating said tone-transmitting relay temporarily when said call switch is opened thereby causing said temporary transmission of the blocking tone.

5. A system as claimed in claim 1, in which said receiver blocking circuit comprises a grid-controlled electron tube having an output circuit connected to control the operability of said reproducing means in response to the amount of current flow in said tube, and further including a pair of rectifiers connected with opposite polarities between said control grid and the respective said first and second filter means thereby to cause said current flow to vary in response to said tones.

References Cited in the file of this patent

UNITED STATES PATENTS

| | | |
|---|---|---|
| 1,773,613 | Clark | Aug. 19, 1930 |
| 2,344,618 | Koch | Mar. 21, 1944 |
| 2,478,361 | Bartelink | Aug. 9, 1949 |
| 2,495,452 | Grove | Jan. 24, 1950 |
| 2,680,154 | Dorff | June 1, 1954 |
| 2,721,935 | Dorff | Oct. 25, 1955 |
| 2,743,361 | Bauman | Apr. 24, 1956 |